United States Patent Office 2,848,498
Patented Aug. 19, 1958

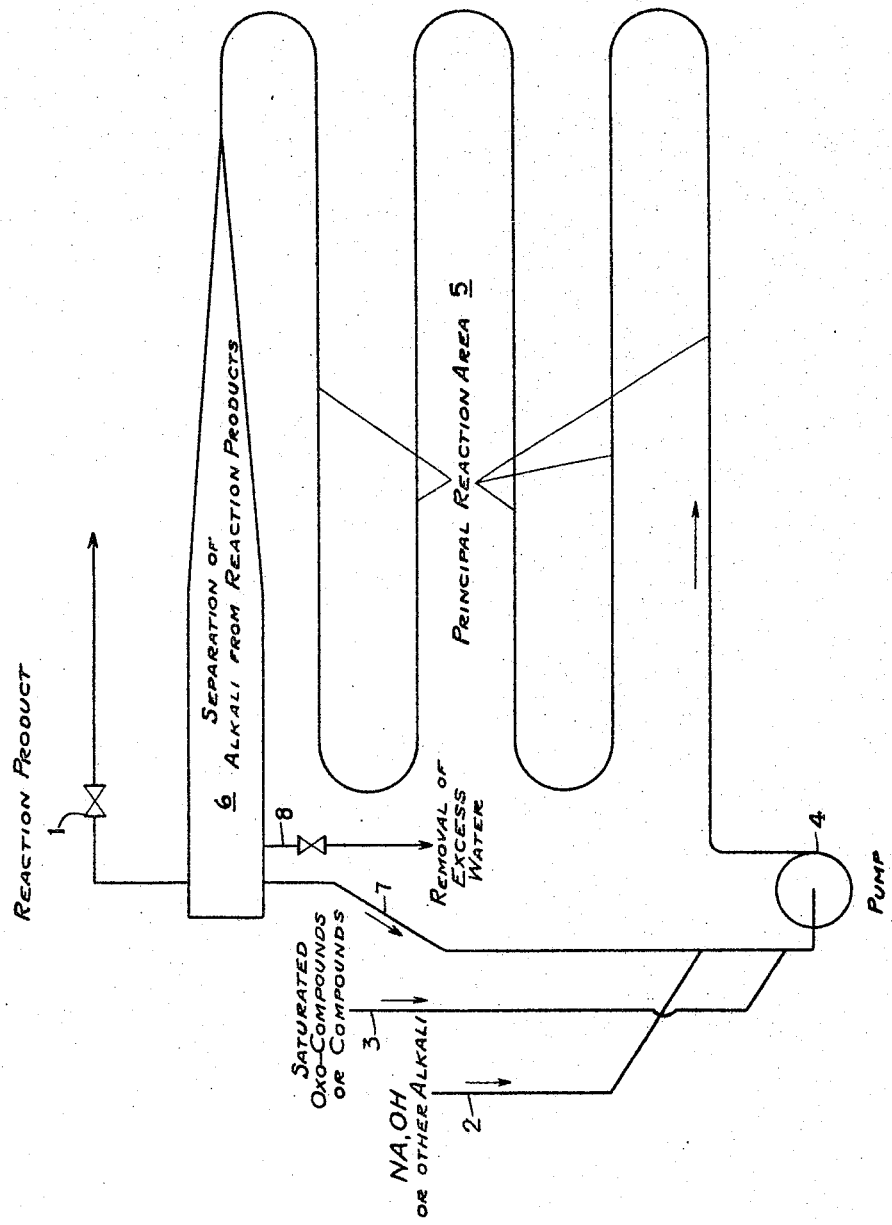

2,848,498

PROCESS FOR TREATING SATURATED OXO COMPOUNDS

Maurice Mention, Melle, France, assignor to Les Usines de Melle (Societe Anonyme), Saint-Leger-les-Melle, France, a corporation of France Application September 16, 1954, Serial No. 456,377

Claims priority, application France October 16, 1953

9 Claims. (Cl. 260—594)

This invention relates to the production of aldols, ketols, and unsaturated oxo compounds from one or more saturated oxo compounds, at least one of said oxo compounds containing three or more carbon atoms in the molecule.

In accordance with known processes such condensation reactions have always involved the use of small proportions of condensation catalyst—usually a solution of sodium hydroxide—to avoid production of polycondensation byproducts. In known processes in which the reaction mixture is circulated through a cyclic circuit, the sodium hydroxide or other catalyst solution always contains condensation product and uncondensed starting material. Accordingly the reaction speed is low and apparatus of huge size is required.

The principal object of the present invention, accordingly, is to provide a simple and efficient process for the production of aldols, ketols and unsaturated oxo compounds.

The invention accordingly comprises the novel processes and steps of processes, specific embodiments of which are described hereinafter by way of example and in accordance with which I now prefer to practice the invention.

It has been found, in accordance with my invention, that in contradistinction to conventional practice it is advisable to cause the saturated oxo compound or compounds involved to be in contact with a very large volume of aqueous solution of condensation catalyst and a correspondingly large amount of catalyst substantially free of foreign substances. It is thereby possible to realize very high reaction speed while lowering production of polycondensation products, and to operate in an apparatus of comparatively small size.

My invention accordingly provides a process which comprises mixing a stream of a saturated oxo compound or compounds, at least one of them having three or more carbon atoms, with a stream of an aqueous alkaline condensation agent. The rate of flow of the mixed streams is maintained at 10 to 100 times, and preferably at 10 to 30 times, as great as the rate of feed of the saturated oxo compound or compounds. The content of alkaline condensation agent in the mixture is maintained equivalent to 1–300 grams perliter of sodium hydroxide. The condensation product, aldol, ketol or unsaturated oxo compound is accordingly produced, the temperature of the streams during reaction being maintained in a range sufficient to produce the condensation product. The rapid flowing of the mixed stream causes same to be violently turbulent until the condensation reaction is ended. Thereafter the condensation product is separated and may be recovered.

When operating in accordance with this invention the condensation reaction is achieved within a very short time of the order of a few seconds.

The preferred alkaline condensation agent is sodium hydroxide and with a view to simplifying the description of this invention sodium hydroxide will generally be referred to hereinafter as the condensation catalyst, but it is to be understood that the invention should not be considered as being limited to the use of that particular condensation agent.

The temperature to be maintained throughout the reaction stream during the condensation reaction depends upon the kind of desired product. It will be preferably at 0–60° C., more particularly 10–40° C., for producing aldols and ketols, and at 50–150° C., more particularly 100–140° C., for producing unsaturated oxo compounds. The desired temperature is maintained preferably by indirect heat exchange with a suitable fluid.

The strength of the sodium hydroxide or other alkaline catalyst solution, which corresponds generally to from 1 to 300 grams per liter of NaOH, also depends upon the kind of desired product. It will be preferably 1–20 grams, more particularly 2–10 grams per liter for producing aldols, 20–300 grams, more particularly 50–250 grams per liter for producing ketols and 1–150 grams pr liter for producing unsaturated oxo compounds.

In carrying out the process of the invention the reacted mixture is preferably allowed to separate into two phases having different specific weights, one of the said phases consisting of the aqueous solution of sodium hydroxide substantially free of foreign substances, the other containing the condensation products. In accordance with a preferred manner of carrying out this invention, such a separation is effected, for example, by decantation, as soon as the condensation reaction is at an end and the solution of sodium hydroxide so recovered is re-used in the process. The separation step is realized by admitting the reaction stream to a quiescent zone so that decantation can take place therein.

In the case where the process only involves an addition reaction (production of aldols and ketols), water is not formed by the reaction, whereas water is evolved by the production of unsaturated oxo compounds; in the latter case, consequently, it is necessary to discard from the decanting zone a proportion of aqueous layer corresponding to the amount of water evolved by the reaction. As the water is discarded as aqueous solution of sodium hydroxide, such removal of sodium hydroxide should be compensated for by introducing sodium hydroxide into the reaction zone at a point near the feed point for the starting, saturated oxo compound or compounds. In most cases, it is recommended to introduce the compensating amount of sodium hydroxide in the form of an aqueous solution thereof, as concentrated as possible. In certain cases for the production of aldols or ketols it may also be necessary to introduce supplemental sodium hydroxide to compensate for losses of same.

The conditions described may be realized in an apparatus comprising a circulating pump, the rate of circulation of which is very high as compared with the rate of feed of the starting, saturated oxo compound or compounds, which preferably are introduced at a point just upstream of the pump, with the supplemental sodium hydroxide, if any. Down-stream of the pump there is produced an intimate dispersion of the saturated oxo compound or compounds throughout the sodium hydroxide solution. The mixture obtained is circulated at high speed through the reaction circuit which is only constituted by a very long pipe in which the reaction takes place. Then the mixture passes to a zone of enlarged cross-section where the speed of motion of the liquid mixture is diminished, causing separation of the mixture into two layers. The insoluble reaction product is withdrawn at a suitable rate while the sodium hydroxide solution is recycled to the pump.

As stated above, the mixture is violently turbulent until the reaction is ended. Separation of the sodium hydroxide solution and reaction product is effected as soon as the turbulence ceases, that is, when the reaction is ended. Only separated sodium hydroxide solution is recycled.

The operation may be carried out at atmospheric or superatmospheric pressure. Superatmospheric pressure is required to maintain the mixture in liquid condition in the case where the reaction temperature is above the boiling points of the substances used and the reaction products.

The annexed drawing diagrammatically shows an apparatus suitable for carrying out the process of this invention. There is introduced into the circulated dilute sodium hydroxide solution through pipe 3 the starting, saturated oxo compound or compounds, and through pipe 2, supplemental, concentrated sodium hydroxide solution if need be. Both pipes 2 and 3 are upstream with respect to pump 4. The emulsion produced by pump 4 passes at high speed through reaction pipe 5 where the reaction occurs. Pipe 5 may be fitted, on the whole or part of its length, with a cooling jacket through which is circulated a cooling fluid, preferably water, in the case where the heat exchange with the surrounding atmosphere through the large surface of the pipe does not ensure sufficient removal of heat. Then the mixture enters decanter 6 from which the reaction product is withdrawn through pipe 1 and the sodium hydroxide solution is recycled through pipe 7 to pump 4.

In the case where water must be removed from the apparatus (viz., by the production of unsaturated oxo compounds), decanter 6 may be fitted at its lower part with a pipe 8 which, as an alternative, may be connected to pipe 7. In industrial practice it may suffice to control the withdrawal of products through pipe 1 so as to remove the desired amount of sodium hydroxide solution together with the unsaturated oxo compound.

The volume of that part of the circuit which constitutes the actual reaction zone (i. e., the pipe 5) is preferably of from 1 to 10% of the volume of starting oxo compound or compounds fed per hour.

The following examples will show how this invention is preferably carried out.

*Example 1.—Manufacture of ethyl propyl acrolein*

Pipe 5 has an inner diameter of 40 mm. and a length of 20 m. Decanter 6 comprises a conic portion having a vertex angle of 7° and a maximum diameter of 300 mm., then a cylindrical portion having a diameter of 300 mm. and a length of 1 m. Thus the volume of reaction pipe 5 is 25 liters and that of decanter 6 is 130 liters.

An absolute pressure of 4 kg./cm.$^2$ is maintained just upstream of pump 4 by feeding fluids through pipes 2 and 3 by means of suitable pumps. There is fed through pipe 2, 25 liters per hour of aqueous solution of sodium hydroxide containing 300 g. NaOH per liter, and through pipe 3, 750 liters per hour of water-saturated butyraldehyde.

Circulation pump 4 causes the liquid mixture to circulate at a rate of 15,000 liters per hour, i. e. 20 times as high as the rate of feed of the butyraldehyde.

The concentration of sodium hydroxide throughout the reaction circuit amounts to 60 grams per liter. The temperature in pipe 5 is maintained at 120–122° C. through slight cooling by introduction of cold water into the water jacket.

There is withdrawn per hour through pipe 1, 630 liters of ethyl propyl acrolein and 118 liters of aqueous solution of sodium hydroxide containing 60 g. NaOH per liter. (As specified above, it is also possible to withdraw these 118 liters of NaOH solution through a separate pipe 8.)

The mixture withdrawn through pipe 1 is cooled and introduced into a separate decanter in which it separates into two layers, the lower layer being the aqueous solution of sodium hydroxide and the upper layer consisting of ethyl propyl acrolein containing 0.2–0.3% of unconverted butyraldehyde and 3% of poly-condensed products. The upper layer can be directly subjected to hydrogenation to produce ethyl hexyl alcohol.

The butyraldehyde converted was 99.8%.

The yield with respect to butyraldehyde converted is over 95%. The duration of reaction was of 6 seconds only.

In the following examples the same apparatus was used and the same process steps were followed as in Example 1. In Example 2 the process is conducted for the manufacture of ethyl propyl acrolein under different rates of flow and withdrawal of reactants; different temperature conditions were employed and such data is given below. The apparatus is the same as used in Example 1 for all following examples with some variation in capacity as noted therein.

In Example 3 the manufacture of diacetonalcohol is given and in the remaining Examples 4–8 various other products are made. Data in connection with the process for the production of these materials is given in the examples mentioned.

*Example 2.—Manufacture of ethyl propyl acrolein*

The numerical data was as follows:

| | |
|---|---|
| Butyraldehyde feed (pipe 3) | 180 liters/hr. |
| Aqueous NaOH (300 g./l.) solution feed (pipe 2) | 5 liters/hr. |
| Circulation of mixed butyraldehyde and NaOH | 15000 liters/hr. |
| Concentration of the circulated NaOH solution | 50 grams/liter. |
| Temperature | 108–110° C. |
| Volume of pipe 5 | 25 liters. |
| Volume of decanter 6 | 130 liters. |
| Ratio of the circulation rate to the butyraldehyde feed rate | 83:1. |
| Butyraldehyde converted | 99.9 percent. |
| Ethyl propyl acrolein produced per hour | 150 liters. |
| Polycondensed products | 3.5 percent. |
| Withdrawal of NaOH aqueous solution per hour | 35 liters. |
| Ethyl propyl acrolein yield based on butyraldehyde converted | 95 percent. |
| Duration of the reaction | 6 seconds. |
| Absolute pressure on system | 4 kg./cm.$^2$. |

*Example 3.—Manufacture of diacetonalcohol*

The numerical data was as follows:

| | |
|---|---|
| Aceton feed (pipe 3) | 115 kg./hr. (or 145 liters/hr.). |
| NaOH (10 g./l.) solution feed (pipe 2) | 25 kg./hr. |
| Concentration of the circulated NaOH solution | 200 g./liter. |
| Temperature | 15° C. |
| Circulation rate | 3000 liters/hr. |
| Ratio of the circulation rate to the acetone feed rate | 20.7:1. |
| Volume of pipe 5 | 5 liters. |
| Volume of decanter 6 | 100 liters. |
| Water content of the product withdrawn through pipe 1 | 18 percent. |
| Acetone converted | 11.3 percent. |
| Diacetonalcohol produced per hour | 13 kg. |
| Diacetonalcohol yield with respect to converted acetone | 99 percent. |
| Duration of the reaction | 6 seconds. |
| Pressure | atmospheric. |

*Example 4.—Manufacture of methyl ethyl acrolein*

| | |
|---|---|
| Butyraldehyde feed | [1] 108 kg./hr. |
| Acetaldehyde feed | [1] 22 kg./hr. |
| Aqueous NaOH (50 g./l.) solution feed (pipe 2) | 1.5 liters/hr. |
| Concentration of the circulated NaOH solution | 5 grams/liter. |
| Temperature | 70° C. |

[1] 162 liters/hr. (pipe 3).

Circulation rate _____ 3000 liters/hr.
Ratio of the circulation rate to the total
  aldehyde feed rate _____ 18.5:1.
Volume of pipe 5 _____ 5 liters.
Volume of decanter 6 _____ 100 liters.
Withdrawal of reaction product through
  pipe 1 _____ 150 liters/hr.
Withdrawal of 5 g./l. NaOH solution
  through pipe 1 _____ 15 liters/hr.
Composition of the reaction product:
  Unconverted butyraldehyde _____ 16 kg.
  Methyl ethyl acrolein _____ 42 kg.
  Ethyl propyl acrolein _____ 42 kg.
  Polycondensed products _____ 17 kg.
Duration of the reaction_____ 6 seconds.
Pressure_____ 4 kg./cm.$^2$.

*Example 5.—Manufacture of butyraldol*

Butyraldehyde feed _____ 310 kg./hr. (or 380 liters/hr.).
Aqueous NaOH (20 g./l.) solution feed 2 liters/hr.
Concentration of the circulated NaOH
  solution _____ 3.5 grams/liter.
Temperature _____ 30° C.
Circulation rate _____ 5000 liters/hr.
Ratio of the circulation rate to the bu-
  tyraldehyde feed rate _____ 13.1:1.
Volume of pipe 5 _____ 5 liters.
Volume of decanter 6 _____ 100 liters.
Withdrawal of reaction product through
  pipe 1 _____ 325 liters/hr.
Withdrawal of 3.5 g./l. NaOH solution
  through pipe 1 _____ 6 liters/hr.
Butyraldehyde converted _____ 57.5 percent.
Yields with respect to converted butyral-
  dehyde:
    Butyraldol _____ 93 percent.
    Ethyl propyl acrolein _____ 6.5 percent.
    Polycondensed products _____ 0.5 percent.
Duration of the reaction _____ 3.6 seconds.
Pressure _____ atmospheric.

*Example 6.—Manufacture of pentyl hexyl acrolein*

Heptaldehyde feed _____ 140 liters/hr. (or 114 kg./hr.).
Aqueous NaOH (300 g./l.) solution feed 4.5 liters/hr.
Concentration of the circulated NaOH
  solution _____ 60 grams/liter.
Temperature _____ 107° C.
Circulation rate _____ 5000 liters/hr.
Ratio of the circulation rate to the hept-
  aldehyde feed rate _____ 36:1
Volume of pipe 5 _____ 12 liters.
Volume of decanter 6 _____ 70 liters.
Withdrawal of reaction product through
  pipe 1 _____ 122 liters/hr. (or 105 kg./hr.).
Withdrawal of 60 g./l. NaOH solution
  through pipe 1 _____ 22 liters/hr.
Duration of the reaction _____ 3.6 seconds.
Pressure _____ 1 kg./cm.$^2$.

The pentyl hexyl acrolein obtained contained 5% of polycondensed products.

*Example 7.—Manufacture of furfurylidene acetone*

Feed of equimolecular mixture of fur-
  fural and acetone_____ 3 liters/hr.
Aqueous KOH (300 g./l.) solution feed 0.2 liters/hr.
Concentration of the circulated KOH
  solution _____ 15 grams/liter.
Temperature _____ 28° C.
Circulation rate _____ 300 liters/hr.
Ratio of the circulation rate to the alde-
  hyde-ketone mixture feed rate _____ 100:1.
Volume of pipe 5 _____ 0.18 liters.
Volume of decanter 6 _____ 2 liters.
Total oxo compounds converted _____ 96 percent.
Yields with respect to converted oxo
  compounds:
    Furfurylidene acetone _____ 65 percent.
    Polycondensed products _____ 35 percent.
Duration of the reaction _____ 22 seconds.
Pressure _____ atmospheric.

*Example 8.—Manufacture of 3-hepten 2-one*

Feed of equimolecular mixture of butyr-
  aldehyde and acetone_____ 4.5 liters/hr.
Aqueous KOH solution feed _____ 0.05 liters/hr.
Concentration of circulated aqueous
  KOH solution _____ 180 grams/liter.
Temperature _____ 112° C.
Circulation rate _____ 300 liters/hr.
Ratio of the circulation rate to the alde-
  hyde-ketone mixture feed rate _____ 66.6:1.
Volume of pipe 5_____ 0.18 liters.
Volume of decanter 6_____ 2.5 liters.
Total oxo compounds converted_____ 90 percent.
Yields with respect to converted oxo
  compounds:
    Heptenone _____ 39 percent.
    Ethyl propyl acrolein _____ 26 percent.
    Polycondensed products _____ 35 percent.
Duration of the reaction _____ 22 seconds.
Pressure _____ 1.5 kg./cm.$^2$.

What I claim is:

1. A process which comprises reacting for a short period a mixture of a saturated oxo compound having at least 3 carbon atoms with an aqueous alkaline condensation agent, flowing turbulently at high speed, to produce a condensation product, substantially immediately separating the entire mixture of said agent and reaction product as the turbulence ceases, and recycling only the alkaline condensation agent so separated for reuse in the process, the rate of flow of the mixture being 10 to 100 times as great as the feed of the oxo compound, and the alkaline condensation agent in the mixture being equivalent to 1 to 300 grams per litre of sodium hydroxide.

2. A process which comprises reacting for a period of about 3 to about 22 seconds a mixture of a saturated oxo compound having at least 3 carbon atoms with an aqueous alkaline condensation agent, flowing turbulently at high speed, to produce a condensation product, substantially immediately separating the entire mixture of said agent and reaction product as the turbulence ceases, and recycling only the alkaline condensation agent so separated for reuse in the process, the rate of flow of the mixture being 10 to 100 times as great as the feed of the oxo compound, and the alkaline condensation agent in the mixture being equivalent to 1 to 300 grams per litre of sodium hydroxide.

3. A process in accordance with claim 1, in which the reacted mixture is allowed to flow through a quiescent zone for immediate separation by decantation, the volume of which zone increases gradually so that the linear speed and turbulence of said mixture decrease accordingly.

4. A process which comprises reacting for a period of about 3 to about 22 seconds a mixture of butyraldehyde with aqueous sodium hydroxide flowing turbulently at high speed to produce a condensation product, substantially immediately separating the entire mixture of aqueous sodium hydroxide and reaction product as the turbulence ceases, and recycling only the sodium hydroxide solution so separated for reuse in the process, the rate of flow of the mixture being 10 to 100 times as great as the feed of the butyraldehyde and the sodium hydroxide being present in the proportion of 1 to 300 grams per litre.

5. A process in accordance with claim 1, in which the temperature of said mixed stream is maintained between 0–60° C., for producing aldols and ketols.

6. A process in accordance with claim 1, in which the temperature of said mixed stream is maintained between 50–150° C., for producing unsaturated oxo compounds.

7. A process in accordance with claim 1, in which the content of alkaline condensation agent, reckoned as NaOH, is 1–20 grams per liter of the aqueous solution of such alkaline condensation agent for producing aldols.

8. A process in accordance with claim 1, in which the content of alkaline condensation agent, reckoned as NaOH, is 20–300 grams per liter of the aqueous solution of such alkaline condensation agent, for producing ketols.

9. A process in accordance with claim 1, in which a mixture of saturated oxo compounds, at least one of them having three or more carbon atoms, is employed.

References Cited in the file of this patent

UNITED STATES PATENTS

| | | |
|---|---|---|
| 2,468,710 | Hull | Apr. 26, 1949 |
| 2,517,690 | Lienhart | Aug. 8, 1950 |